(12) United States Patent
Hooley

(10) Patent No.: US 11,863,824 B2
(45) Date of Patent: Jan. 2, 2024

(54) OFFER INCLUSION FOR OVER THE TOP (OTT) CONTENT

(71) Applicant: Cable Television Laboratories, Inc., Louisville, CO (US)

(72) Inventor: David Hooley, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1426 days.

(21) Appl. No.: 15/012,200

(22) Filed: Feb. 1, 2016

(65) Prior Publication Data

US 2016/0155159 A1 Jun. 2, 2016

Related U.S. Application Data

(63) Continuation of application No. 13/889,523, filed on May 8, 2013, now Pat. No. 9,251,534.

(51) Int. Cl.
 *H04N 21/458* (2011.01)
 *H04L 43/00* (2022.01)
 *H04L 9/40* (2022.01)

(52) U.S. Cl.
 CPC ........... *H04N 21/458* (2013.01); *H04L 43/00* (2013.01); *H04L 63/0428* (2013.01); *G06Q 2220/10* (2013.01)

(58) Field of Classification Search
 CPC .. H04N 1/00; H04N 3/00; H04N 5/00; H04N 7/00
 See application file for complete search history.

(56) References Cited

U.S. PATENT DOCUMENTS

| | | | | |
|---|---|---|---|---|
| 8,875,213 | B2 * | 10/2014 | Harris | H04N 21/43615 141/153 |
| 2002/0064282 | A1 * | 5/2002 | Loukianov | H04L 63/06 380/277 |
| 2002/0186320 | A1 * | 12/2002 | Carlsgaard | H04N 5/44504 348/554 |
| 2004/0128348 | A1 * | 7/2004 | Gilbert | G06F 16/986 707/E17.118 |
| 2004/0237100 | A1 * | 11/2004 | Pinder | H04N 21/63345 380/278 |
| 2007/0288975 | A1 * | 12/2007 | Cashman | H04N 21/42202 725/110 |
| 2008/0001773 | A1 * | 1/2008 | Rye | G08C 17/00 345/169 |
| 2008/0025306 | A1 * | 1/2008 | Kamura | H04L 65/611 370/390 |
| 2008/0098450 | A1 * | 4/2008 | Wu | H04N 21/4622 725/132 |
| 2009/0167855 | A1 * | 7/2009 | Kummer | H04N 7/18 348/E7.001 |
| 2009/0310606 | A1 | 12/2009 | Chen | |
| 2012/0315008 | A1 * | 12/2012 | Dixon | H04N 21/472 386/230 |

(Continued)

*Primary Examiner* — Marie P Brady
(74) *Attorney, Agent, or Firm* — Josh C. Snider

(57) ABSTRACT

Inspection of over the top (OTT) content to facilitate offering non-OTT content or other content and/or services as an alternative to the OTT content is contemplated. The OTT content may be inspected at an access point configured to provide a broadband or other connection between a device consuming the OTT content and a device sourcing the content. Data packets or other signaling may be added to the OTT content at the access point in order to announce the offer.

10 Claims, 3 Drawing Sheets

(56) References Cited

U.S. PATENT DOCUMENTS

| | | | | |
|---|---|---|---|---|
| 2013/0227284 | A1* | 8/2013 | Pfeffer | H04N 21/64707 713/168 |
| 2013/0276022 | A1* | 10/2013 | Tidwell | G06Q 30/0241 725/34 |
| 2013/0276035 | A1* | 10/2013 | Walker | H04N 21/8456 725/62 |
| 2014/0067828 | A1* | 3/2014 | Archibong | H04N 21/84 707/748 |
| 2014/0281489 | A1* | 9/2014 | Peterka | H04N 21/4627 713/153 |
| 2015/0074722 | A1* | 3/2015 | Sinha | H04N 21/466 725/46 |

* cited by examiner

OFFER INCLUSION FOR OVER THE TOP (OTT) CONTENT

CROSS-REFERENCE TO RELATED APPLICATIONS

This application is a continuation of U.S. application Ser. No. 13/889,523, filed May 8, 2013, the disclosure and benefit of which is hereby incorporated in its entirety by reference herein.

TECHNICAL FIELD

The present invention relates to including offers with over-the-top (OTT) content, such as but not necessarily limited to facilitate advertise availability of non-OTT content from another source.

BACKGROUND

Cable television service providers, Internet service providers, cellular service providers and other primary providers of services may provide an infrastructure through which electronic data may be communicated between a source device and a destination device. These service providers may also provide supplemental services in addition to their data services, such as but not necessary limited to television programming, media streaming, video-on-demand (VOD), gaming, etc. As more and more content, media and other information becomes available from different sources, some devices may rely upon the data service provider to provide the data transmissions while simultaneously relying upon a secondary source to provide supplemental services. One non-limiting aspect of the present invention contemplates a desirability of announcing to those subscribers the ability of the primary service provider to facilitate access to the same or related supplemental services, such as to draw the subscribers usage away from the secondary source and/or to offer improved performance or other benefits in exchange for the subscribers patronage of the primary service.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
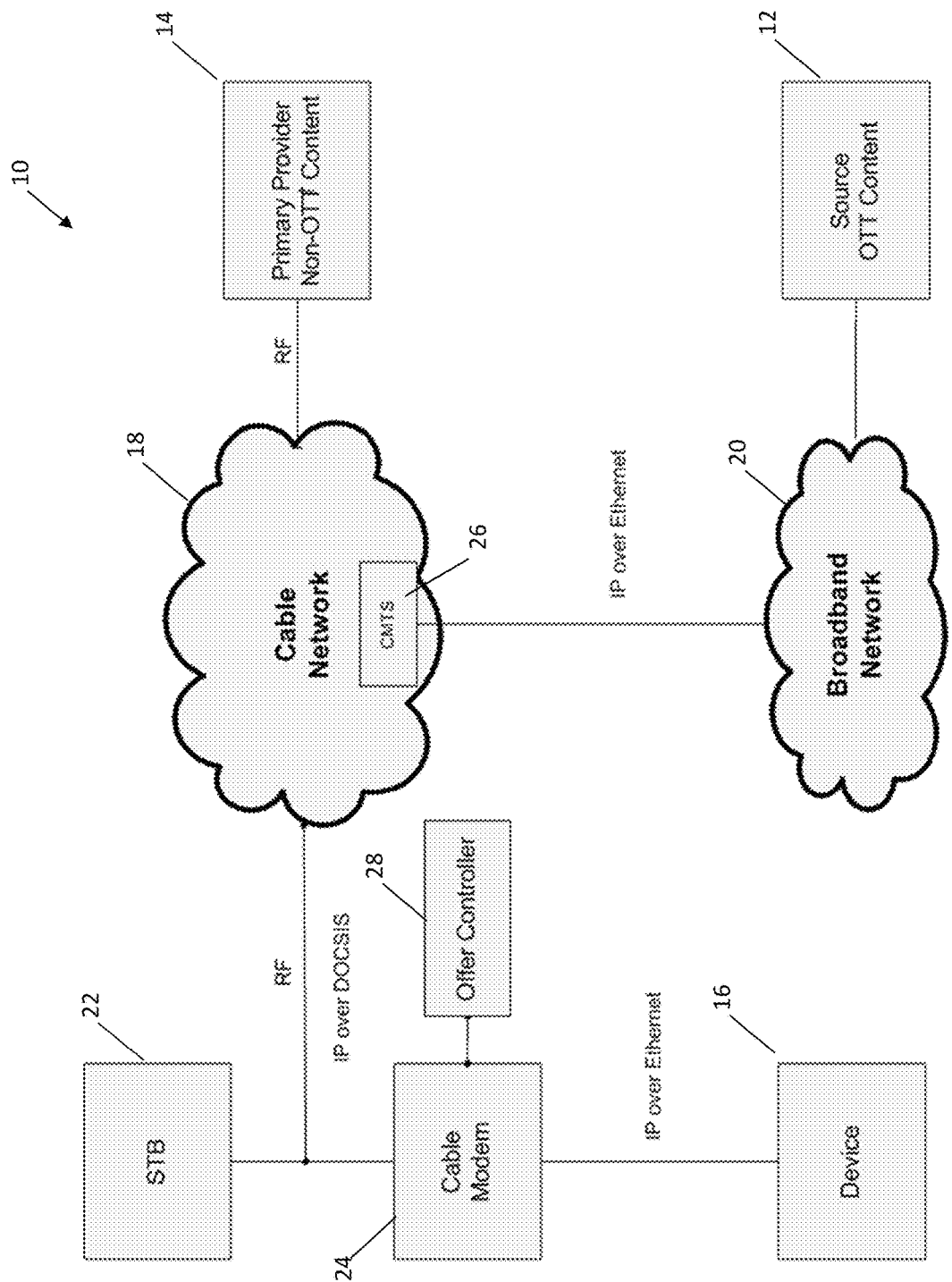
FIG. 1 illustrates an offer inclusion system in accordance with one non-limiting aspect of the present invention.

FIG. 1 illustrates an offer inclusion system 10 in accordance with one non-limiting aspect of the present invention. The system 10 illustrates a source 12 providing over-the-top (OTT) content and a primary provider 14 providing non-OTT content to a device 16. The primary provider 14 may be a cable television service provider, Internet service provider, cellular service provider and/or other provider of electronic services, such as a multiple system operator (MSO), operating an infrastructure sufficient to facilitate providing various signaling dependent services to a subscriber associated with the device 16. The primary provider 14 is shown to include an infrastructure including a cable network 18 and a broadband network 20, which are separately depicted but may be included as part of the same network. The cable network 18 may rely upon a set top box (STB) 22 or other device at a subscriber location to interface signaling with the device 16 and the broadband network 20 may rely upon a cable modem 24 or other device at the subscriber location to interface signaling with the device 16. The STB 22 may be used to descramble television related signaling or other signaling carried over the cable network 18 and the cable modem 24 may be used to process data packets and other information carried over the broadband network 20 by way of a cable modem terminal system (CMTS) 26.

The cable network 18 is illustrated independently of the broadband network 20 in order to demarcate separate infrastructures within the control or support of the primary provider 14. This arrangement may correspond with the primary provider utilizing a common wired/cable or other delivery mechanism (e.g., wireless) to transport television signaling and data signaling to a customer premise whereupon customer premise equipment (CPE), such as the STB 22 and the cable modem 24, are then separately and respectively used to interface the television signaling and the data signaling with the device 16. While the STB 22 and the cable modem 24 are shown to be separate devices, such devices and/or the capabilities associated therewith, may be integrated and optionally included as part of the device 16. This exemplary configuration of the system 10 demonstrates one non-limiting aspect of the present invention where separate mechanisms or infrastructures within the domain or control of a single provider may be used to facilitate delivery of the non-OTT content and the OTT content. In this manner, the OTT content may be considered as content sourced from an entity beyond the control or domain of the primary provider 14 over infrastructure provided by or in control of the primary provider 14 and the non-OTT content may be considered as content sourced from the primary provider 14 over infrastructure provided by or in control of the primary provider 14.

The nature of the media, data, information or other characteristics of the OTT content and the non-OTT content may in some cases be similar or the same. In the context of a television program, for example, the primary provider 14 may be configured to source the television program using high definition (HD) television signaling while the source 12 or other secondary provider may be configured to source the same television program using standard definition (SD) television signaling. The scenario may be common in environments where the broadband network 20 or data communication mechanism relied upon by the source 12 is less suitable for use than the cable network 18 or other communication mechanism relied upon by the primary provider 14 when transmitting the higher throughput signaling associated with HD television. One non-limiting aspect of the present invention contemplates notifying a subscriber at the device 16 when accessing OTT content, such as the SD television program, that the same, related or matching television program is available in HD or in some other enhanced or more beneficial configuration from the primary provider 14. While the present invention is not necessary limited to this exemplary description of HD and SD television programming, it is presented to indicate one scenario of many possible scenarios where it may be desirable to offer non-OTT content as an alternative to a subscriber accessing OTT content.

The differentiation between OTT content and non-OTT content may be based on the provider or originator of the corresponding content transmission. The OTT content may be considered as that which is being transmitted over infrastructure within the domain or control of an entity other than the entity originating the corresponding signaling. The non-OTT content may be considered as that which is being transmitted over infrastructure within the domain or control of the entity originating the corresponding signaling. The OTT content may be delivered without the primary provider 14 or the provider of the broadband network 20 (network being used to carry the corresponding date) being responsible for the content and/or its distribution to the device 16. The non-OTT content may be delivered with the primary provider 14 being responsible for the content and/or its distribution to the device 16. The primary provider 14 may be charged with maintaining and supporting infrastructures associated with the non-OTT content and its delivery whereas the primary provider 14 may not be charged with similar responsibilities when supporting transmission of the OTT content. When supporting non-OTT content, the primary provider 14 may be aware of the nature and/or subject matter of the non-OTT content due to its attendant responsibilities. When supporting OTT content, the primary provider 14 may be unaware of the nature and/or subject matter of the OTT content due to its lack of responsibilities and/or involvement in the OTT content selection and/or delivery.

The differentiation between OTT content and non-OTT content may also be based on the communication mediums and/or protocols utilized when the corresponding content is transmitted. One non-limiting aspect of the present invention contemplates the OTT content being transmitted with Internet protocol (IP) signaling and/or through a broadband connection and the non-OTT content being transmitted with non-IP signaling and/or through a non-broadband connection. These distinctions are presented as one of many exemplary distinctions by which OTT content may be resolved relative to non-OTT content, optionally in addition to or in place of the above-described OTT and non-OTT content differentiations. The IP signaling, which may be carried according to Data Over Cable Service Interface Specifications (DOCSIS) 3.0, the disclosure of which is hereby incorporated by reference in its entirety, may correspond with transmission of data packets or other data sets utilizing packet-switching capabilities and/or signaling complying with IP version 4 (Ipv4) defined in RFC-791 and IP version 6 (IPv6) defined in RFC-2460, the disclosures of which are hereby incorporated by reference in their entireties. The non-IP or RF signaling may correspond with transmission of analog video content that has been digitized using FDM (Frequency Division Multiplexing), optionally utilizing circuit-switching capabilities. The broadband connection may be provided through the cable modem 24 and the CMTS 26 to facilitate a transmission medium that allows transmission of voice, data, and video simultaneously at rates of 1.544 Mbps or higher, optionally with media being carried using multiple channels—each at a different frequency or specific time slot. The non-broadband connection may be provided through the STB 22 to facilitate the transmission of digitized video content.

The differentiation between OTT content and non-OTT content may also be based on a number of recipients receiving the corresponding content. One non-limiting aspect of the present invention contemplates the OTT content being delivered on a one-to-one basis and/or through unicast and the non-OTT content being transmitted on a one-to-many basis and/or through multicast. These distinctions are presented as one of many exemplary distinctions by which OTT content may be resolved relative to non-OTT content, optionally in addition to or in place of the above-described OTT and non-OTT content differentiations. The recipient based assessment of OTT and non-OTT content may be beneficial in scenarios where the primary provider 14 delivers common signaling to a plurality of subscribers and the source 12 delivers signaling to a single subscriber or through multiple-signaling paths to multiple subscribers. The protocols and/or transmission mechanism utilized to facilitate these types of recipient limited communications may be useful in distinguishing when services are being accessed utilizing infrastructures of the primary provider 14 while the underlying content is being accessed without control or authorization from the primary provider 14, i.e., a scenario where the primary provider 14 may desire to offer an alternative source for the content than that which is currently being used. The OTT content, for example, may be accessed through a tunnel constructed between the device 16 and the source 12 using the infrastructure of the primary provider 14.

As described above, a number of differentiations may be employed to distinguish between OTT and non-OTT content. Once such a differentiation is made, an offer controller 28 may be utilized in accordance with the present invention to facilitate including an offer with the OTT content. The offer may be included with the OTT content to notify the subscriber of an alternative to the OTT content, such as but not necessarily limited to non-OTT content or other resources associated with the primary provider 14. The offer controller 28 may be within the control or domain of the primary provider 14 and/or a third-party entity tasked with facilitating selection and delivery of an offer likely or intended to draw the subscriber away from the source 12 or other secondary or supplemental provider to the services and/or capabilities of the primary provider 14. The primary provider 14 may desire attraction of such a subscriber in order to sell the subscriber additional services or to otherwise entice the subscriber to commit more activities to the primary provider 14. One non-limiting aspect of the present invention contemplates the offer controller 28 facilitating communication of the offer to the device 16 while the device 16 is accessing the OTT content. The offer may include instructions, commands or other information necessary to automatically control or provide steps for implementing manual control of the device 16 to the offered, non-OTT content following acceptance of the offer, e.g., in response to the subscriber selecting the offer and/or one or more pieces of non-OTT content included within the offer.

Figure 2:
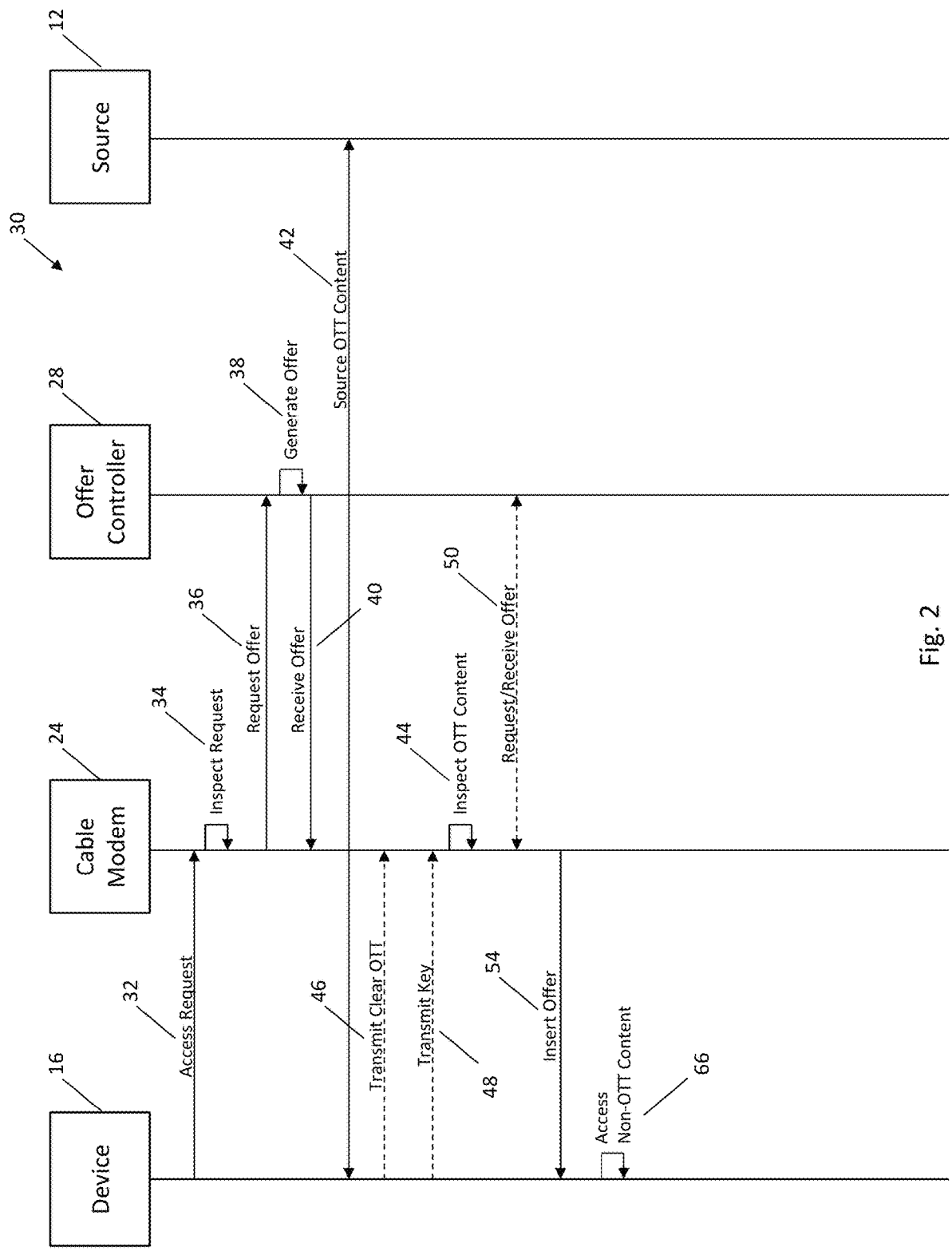
FIG. 2 illustrates a flowchart for a method of offering content in accordance with one non-limiting aspect of the present invention.

FIG. 2 illustrates a flowchart 30 for a method of offering content in accordance with one non-limiting aspect of the present invention. The method may be embodied in a computer-readable medium or computer program product in the form of non-transitory instructions, operable with a suitable processor or other device, to facilitate the processes contemplated herein. The method is predominately described with respect to the exemplary illustrations set forth in FIG. 1 without necessarily intending to limit the scope and contemplation of the present invention as the inventive offer insertion may be utilized in any number of environments. The use of the cable modem 24 is described as one exemplary access point utilized to facilitate the device 16 accessing data transmission carried out over the broadband connection, however, the present invention fully contemplates other types of access points, such as cellular or wireless access points, being utilized to facilitate access to data services or OTT content. The method is also described with respect to a second device (STB 22) other than the cable modem 24 or data access point utilized to access OTT content being used to access the non-OTT content for exemplary non-limiting purposes as the same access point may be used to access both of the OTT and non-OTT content without deviating from the scope and contemplation of the present invention.

The method for offering content may include an assessment of a subscriber associated with the device and/or other operational characteristics of the device. An access request 32 may be transmitted from device 16 to the cable modem 24 to request access to data services and/or to perform a logon operation or other operation required to facilitate informational exchanges necessary to access OTT content. The cable modem 24 may perform an inspection 34 of the access request to deny or grant access to the data transmission medium, i.e., the broadband network. The cable modem 24 may communicate a request offer message 36 to the offer controller 28 in response to identifying the subscriber and/or the device 16. The request offer message 36 may request the offer controller 28 to provide one or more offers suitable for use with the device 16 and/or the subscriber. The offer controller 28 may perform a generate offer process 38 in order to identify the appropriate offer(s). The offer controller may review information or other characteristics of the subscriber and/or the device 16 in order to identify non-OTT content that may be of interest. The offer controller 28, particularly if within the domain of the primary provider 14, may be privileged to information or other data collected by the primary provider 14 and unknown to the source 12. One non-limiting aspect of the present invention contemplates the primary provider 14, i.e. the provider of the cable and broadband networks 18, 20 being in a better position to identify the desires or non-OTT content likely to be of interest to the subscriber based on viewing habits or prior experience gleaned from previously accessed non-OTT content.

A receive offer message 40 may be transmitted from the offer controller 28 to the cable modem 24 with one or more offers identified to be suitable for use with the device 16 and/or the subscriber. The offer controller 28 is shown to be separate from the cable modem 24 for exemplary non-limiting purposes as similar capabilities and/or processes may be executed at the cable modem 24 to facilitate identifying offers believed to be of interest to the device 16 and/or the subscriber. The offers included within the receive offer message 40 may be provisional offers or offers identified prior to or before assessing OTT content currently being accessed or requested for access by the device 16. A source OTT content exchange 42 may occur between the device 16 and the source 12 to establish communication and other operational parameters associated with facilitating delivery of OTT content to the device 16. The OTT content may begin transmitting between the source and device 12, 16 as part of the source OTT content exchange 42. The cable modem 24 may perform an inspection 44 of the IP packets being transmitted over the DOCSIS RF connection in order to determine the nature or subject matter of the OTT content. The inspection 44 may be performed by the cable modem performing a packet inspection of data packets exchanged as part of the source OTT content exchange 42. The packet inspection may optionally be limited to packets or content transmitted in the clear between the source 12 and the device 16.

In the event the OTT content is not transmitted in the clear, a transmit clear OTT content process 46 may occur where the device 12 may transmit clear OTT content to the cable modem 24 for the inspection. The device 16 may decrypt or otherwise process the OTT content to generate the clear content for transmission for the inspection 44 by the cable modem 24. Optionally, instead of the device 16 decrypting the OTT content, a transmit key process 48 may occur where the device 16 transmits a key sufficient to facilitate decrypting the OTT content to the cable modem 24. The cable modem 24 may then decrypt the OTT content being transmitted to the device 16 as part of the inspection 44. The inspection 44 may be performed by the cable modem 24 inspecting clear OTT content transmitted from the source 12, inspecting clear OTT content transmitted from the device 16 and/or decrypting encrypted OTT content transmitted from the source 12. The inspection 44 may be performed at the cable modem 24 positioned downstream of the source 12 and upstream of the device 16. The inspection 44 performed at the cable modem 24 may be particularly beneficial in that the cable modem 24 is within the domain and control of the primary provider 14 such that the primary provider 14 may dictate how data packets are transmitted therethrough, including whether the data packets are subject to inspection.

An optional request/receive offer message exchange 50 may occur between the cable modem 24 and the offer controller 28 following the inspection 44. This message exchange 50 may be used to confirm the offers previously provided to the cable modem 24 prior to identifying the OTT content and/or to request new or updated offers based on the inspection of the OTT content. (Optionally, the inspection 44 may be omitted in the event the offers generated in the prior inspection 34 are deemed sufficient, e.g., if the inspection 44 is not performed or not authorized by the subscriber.) The request/receive offer message exchange 50 may include providing identifying information of the OTT content to the offer controller 28. The offer controller 28 may use the identifying information to perform a matching operation intended to identify or match non-OTT content with the OTT content. The matching may select the non-OTT content most closely matching with the OTT content to be presented within the offer. The ability to identify matching non-OTT content may be beneficial in allowing the primary provider 14 to advertise non-OTT content most likely to draw the subscriber's attention away from the OTT content and/or the source 12.

Figure 3:
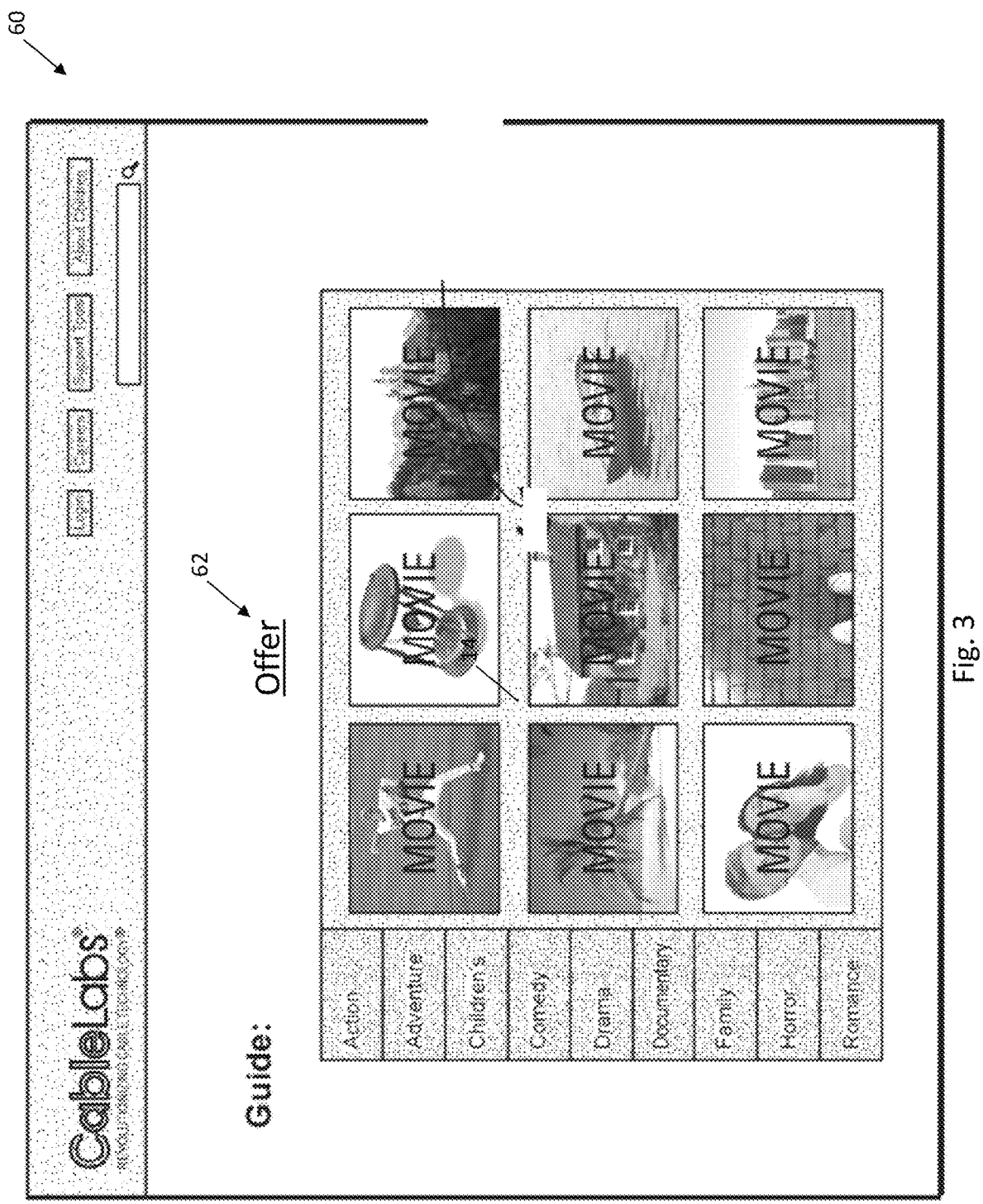
FIG. 3 illustrates a webpage having an offer inserted in accordance with one non-limiting aspect of the present invention.

Once one or more offers are determined, an insert offer process 54 may occur. The insert offer process may include the cable modem including offer packets or other information with the OTT content such that the desired one or more offers are interface through the device 16 with the OTT content. FIG. 3 illustrates a webpage 60 having an offer 62 inserted for display with the OTT content (webpage 60) in accordance with one non-limiting aspect of the present invention. The webpage 60 may be provided through a Web browser operating on the device 16 to facilitate display of an electronic programming guide (EPG) or other OTT content. The EPG may be used to facilitate selection of the SD television program from a listed plurality of programs or to facilitate navigating to other types of OTT content that may be available for streaming through the cable modem. The offer 62 may be inserted within the signaling exchanged between the source 12 and the device 16 to generate the webpage 60 in order to force its presentation as a link, pop-up or other advertisement. The offer 62 is shown for exemplary non-limiting purposes to correspond with a link showing within the webpage 60.

Various mechanisms may be utilized to facilitate transmitting the offer 62 with the OTT content. One process may include embedding offer packets within a signaling stream utilized to transport data packets associated with the OTT content from the source 12 to the device 16. This may include buffering or otherwise temporarily interrupting the OTT content packets in order to facilitate insertion or placement of the offer packets between OTT content packets such that the device processes the offer packets as if included as part of the OTT content. Optionally, the offer packets may be separately transmitted to the device 16 through signaling carried independently of the OTT content through a back channel or a wireless connection, including the document object model (DOM) manipulation and back channel communications described in U.S. patent application Ser. Nos. 13/534,238, 13/721,356 and 13/865,030, the disclosures of which are hereby incorporated by reference in their entireties. One non-limiting aspect of the present invention contemplates the primary provider 14 being in control of the cable modem 24 in a manner that is not feasible with the source 12 such that the primary provider 14 is able to perform various operations on data passing therethrough, including facilitating inspection of the data passing therethrough and/or insertion of desired offers.

Returning to FIG. 2, an access non-OTT content process 66 may occur upon subscriber acceptance of the offer, e.g., following selection of the link showing within FIG. 3 or following engagement with other means of indicating offer acceptance. Selection of the link may result in the device 16 automatically directing the STB 22 to tune to non-OTT content provided from the primary provider 14, such as by providing instructions to the STB 22 to tune to a particular television channel of a headend (not shown). The offer 62 may include instructions or other information sufficient to facilitate directing control of the device 16, which control may vary depending on the configuration of device 16 and/or its operating capabilities. The cable modem 24 and/or the offer controller 28 may be configured to identify the operating characteristics or other limitations of the device 16 and to configure the offer 62 in a sufficient manner to implement the desired control or other operations necessary to direct the device 16 to the non-OTT content or other content offered by the primary provider 14. The offer 60 may be formatted differently if the device 16 is a mobile device or a cellular phone than if the device 16 or a television or an appliance.

As supported above, one non-limiting aspect of the present invention contemplates monitoring user consumption of Over The Top (OTT) content and offer up related premium cable content (non-OTT content) as an alternative. The proposed process may require an operator-provided application to be running in the cable modem or cable settop box. The application may monitor the OTT content being retrieved by a customer in order to look for matches to premium content that the operator has to offer. Matching can be done by various mechanisms, including frame grabbing and IP packet inspection. Optionally, communications encrypted by the customer may be ignored in order to limit inspection to subject in-the-clear content, which may be beneficial in maintaining privacy. When a match condition is triggered, the operator application may insert a hyperlink and/or popup into the delivery stream. The link may be used to offer the customer the opportunity to select content offered by the operator as part of a premium service. As an alternative to affecting the customer's current viewing experience, a message about the alternative content may be delivered to the customer the next time they sign on to the operator network. An opt-in/out choice may be offered as part of the customer profile. Opt-out means links and pop-ups may not be presented to the customer when matches are detected. The application may choose to correlate data from other sources as part of the monitoring and matching algorithm, such sources may include: Linear TV viewing choices (e.g., channel tuning history, favorite channel list, DVR choices, etc.); VOD (Video On Demand) and PPV (Pay Per View) choices; and purchase records from online stores.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for inserting an offer within first content being accessed through a first device, the first content being delivered from a first source to the first device using signaling established between the first device and an access point, the first device being configured to facilitate processing the signaling for interfacing the first content with a user, the first source being located upstream of the access point, the method comprising:

identifying the first content from information included within the signaling;

determining an offer for a second content matching the first content based on a relationship derived from the information; and inserting the offer within or as an addition to the signaling such that the offer is interfaced with the user through the first content, the offer notifying the user of the second content being available via additional signaling transmissible from a second source operating upstream of the access point independently of the first source.

2. The method of claim 1 further comprising:

the access point adding offer packets within a wireless connection being used to carry the signaling to the first device over a broadband connection established between the first device and the access point, the offer packets containing the offer;

the first device using the offer packets to display pop-up during play of the first content, the pop-up notifying the user of the second content being available through a second device operating independently of the first device and connected to the broadband connection; and at least one of the offer controller and the access point providing instructions within the offer packets for the first device to automatically control the second device to access the second content using commands wirelessly transmitted from the first device to the second device over the broadband connection following user acceptance of the offer through the first device.

3. The method of claim 1 further comprising:

an offer controller determining a plurality of additional sources selling the second content; and the offer controller selecting the second source from one of the plurality of additional sources in order to draw the user from the first source to the second source.

4. A method of redirecting a device accessing over the top (OTT) content to non-OTT content, the OTT content being delivered from a source to the device using Internet Protocol (IP) signaling carried over a broadband connection, the non-OTT content being delivered from a headend to a tuner of the device using non-IP signaling carried over a non-broadband connection, the method comprising:
performing an inspection of IP packets included with the IP signaling;
determining inspection information for the OTT content from the inspection;
determining an offer associated with the non-OTT content from processing of the inspection information;
performing an insertion of the offer within the IP signaling carrying the OTT content to the device, the insertion interfacing the offer with a user through the device; and
the device automatically accessing the non-OTT content following an acceptance of the offer.

5. The method of claim 4 further comprising:
determining from the inspection information a matching television program selected from a plurality of non-OTT television programs, the matching television program being the one of the plurality of non-OTT television programs most closely matching an OTT television program being transmitted to the device as the OTT content; and
including instructions in the offer, the device using the instructions to display the matching television program upon determining the acceptance.

6. The method of claim 5 further comprising:
including a link with the offer;
determining user selection of the link; and
the tuner displaying a channel carrying the matching television program upon user selection of the link.

7. The method of claim 4 further comprising:
decrypting the IP signaling at an access point using an encryption key provided to the access point from the device, the access point establishing the broadband connection with the device; and
the access point generating the inspection information based on data determined from decrypting the IP signaling.

8. The method of claim 7 further comprising:
embedding offer data used to generate the offer at the access point as an addition to the IP signaling carrying the OTT content; and
transmitting the offer data to the access point from an offer controller independently of the IP signaling carrying the OTT content.

9. The method of claim 4 further comprising:
performing the inspection such that the inspection information is based on data derived from a decryption of the IP signaling performed by the device and transmitted therefrom to an access point, the access point establishing the broadband connection with the device;
selecting the offer from a plurality of offers made available to the access point from an offer controller, the offer being a one or more of the plurality of offers matching with the data derived from the decryption; and
inserting the offer within the IP signaling by controlling the access point to add corresponding offer data packets to the IP signaling after at least a portion of the OTT content has been transmitted from the source.

10. The method of claim 4 further comprising performing the inspection at an access point used to establish the broadband connection with the device, the access point differentiating between encrypted and unencrypted packets included in the IP signaling and limiting the inspection information to data derived from the unencrypted packets.

* * * * *